United States Patent
Fink

(10) Patent No.: US 9,463,708 B2
(45) Date of Patent: Oct. 11, 2016

(54) METHOD FOR OPERATING AN ELECTRIC TRACTION DRIVE SYSTEM, AND ASSOCIATED CONTROL APPARATUS

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/408,369

(22) PCT Filed: Jun. 4, 2013

(86) PCT No.: PCT/EP2013/061424
§ 371 (c)(1),
(2) Date: Dec. 16, 2014

(87) PCT Pub. No.: WO2014/001028
PCT Pub. Date: Jan. 3, 2014

(65) Prior Publication Data
US 2015/0191099 A1 Jul. 9, 2015

(30) Foreign Application Priority Data
Jun. 27, 2012 (DE) .................. 10 2012 210 907

(51) Int. Cl.
*B60L 11/18* (2006.01)
*B60L 3/00* (2006.01)

(52) U.S. Cl.
CPC .......... *B60L 11/1864* (2013.01); *B60L 3/0046* (2013.01); *B60L 11/1853* (2013.01); *B60L2240/423* (2013.01); *Y02T 10/642* (2013.01); *Y02T 10/7005* (2013.01); *Y02T 10/7061* (2013.01)

(58) Field of Classification Search
CPC .................................... B60L 11/1864
USPC ........................... 318/139, 34, 558
See application file for complete search history.

(56) References Cited

U.S. PATENT DOCUMENTS

| | | | |
|---|---|---|---|
| 6,541,154 B2* | 4/2003 | Oogami | B60L 3/0046 180/68.5 |
| 8,120,291 B2* | 2/2012 | Clark et al. | 318/139 |
| 8,353,374 B2* | 1/2013 | Sugawara et al. | 180/65.1 |
| 9,026,393 B2* | 5/2015 | Xiang et al. | 702/117 |

FOREIGN PATENT DOCUMENTS

| | | |
|---|---|---|
| DE | 10 2008 002 505 A1 | 12/2009 |
| DE | 10 2011 004 248 A1 | 8/2011 |
| DE | 10 2010 041 014 A1 | 3/2012 |

OTHER PUBLICATIONS

International Search Report corresponding to PCT Application No. PCT/EP2013/061424, mailed Nov. 7, 2013 (German and English language document) (5 pages).

* cited by examiner

*Primary Examiner* — David S Luo
(74) *Attorney, Agent, or Firm* — Maginot, Moore & Beck LLP

(57) ABSTRACT

A method for operating an electric traction drive system includes monitoring each of battery modules during operation for satisfactory functioning to detect a technical fault. The method further includes bypassing at least one battery module if a technical fault of the at least one battery module is detected. The method further includes operating the traction drive system in a traction state where an electric motor is supplied and actuated by connected battery modules to the battery module line to enable a currently generated torque to remain unchanged. The electric motor and the battery are positioned to generate an adjustable output voltage of the battery. The battery is configured to supply the electric motor. The battery includes a battery module line and the battery modules. The battery modules are configured to be connected in series with the battery module line or bypassed in the battery module line.

9 Claims, 4 Drawing Sheets

METHOD FOR OPERATING AN ELECTRIC TRACTION DRIVE SYSTEM, AND ASSOCIATED CONTROL APPARATUS

This application is a 35 U.S.C. §371 National Stage Application of PCT/EP2013/061424, filed on Jun. 4, 2013, which claims the benefit of priority to Serial No. DE 10 2012 210 907.2, filed on Jun. 27, 2012 in Germany, the disclosures of which are incorporated herein by reference in their entirety.

The present disclosure relates to a method for operating an electric traction drive system, in which an electric motor and a battery which is provided to supply the electric motor are arranged, said battery comprising, for the generation of an adjustable output voltage of the battery, a battery module line which has a plurality of battery modules which each comprise at least one battery cell and which can each be connected in series to the battery module line or bypassed in the battery module line. In addition, the disclosure relates to a corresponding device for actuating an electric traction drive system. Furthermore, the disclosure relates to a vehicle having an electric traction drive system which has an electric motor, which is connected to the battery direct converter, and the device according to the disclosure for actuating the electric drive system.

BACKGROUND

Batteries which are used in hybrid and electric vehicles and which are referred to as traction batteries since they are used to feed electric drives are known from the prior art.

The basic circuit diagram of an electric traction drive system 10 known from the prior art, such as is used, for example, in electric and hybrid vehicles or else in stationary applications such as in the case of the rotary blade adjustment of wind power plants, is illustrated in FIG. 1. A battery (traction battery) 11 is connected to a direct voltage intermediate circuit which is buffered by a capacitor 60. Connected to the direct voltage intermediate circuit is also a pulse-controlled inverter 50 which makes available sinusoidal voltages with phases which are offset with respect to one another via, in each case, two switchable semiconductor valves 51 and two diodes 52 at three outputs, for operating an electric motor 70. In order to simplify the illustration, just one semiconductor valve and one diode are provided with reference symbols in the drawing. The capacitance of the capacitor 60 is selected to be sufficiently large to stabilize the voltage in the direct voltage intermediate circuit for a time period in which one of the switchable semiconductor valves 51 is connected through. In a practical application such as an electric vehicle, this requires a high capacitance in the range of mF.

Three-phase motors are generally used as the electric motors (electric machines) 70 in such traction drives 10. They are usually asynchronous motors, permanently regulated synchronous motors or externally excited synchronous motors. In order to feed the electric machine 70, pulse-controlled inverters 50 are generally used, said pulse-controlled inverters 50 being generally implemented in the traction region in electric and hybrid vehicles with semiconductor switches 51 which are embodied as bipolar transistors with insulated gate electrodes (IGBT).

The battery 11 which is illustrated in FIG. 1 comprises a battery module line 12 in which a multiplicity of battery cells 21 are connected in series and optionally additionally in parallel in order to obtain a high output voltage and battery capacitance which are desired for a respective application, wherein in order to simplify the illustration just one battery cell has been provided with a reference symbol. A charging and isolating device 30 is connected between the positive pole of the battery cells 21 and a positive battery terminal 22. An isolating device 40 can optionally be additionally connected between the negative pole of the battery cells and an negative battery terminal 23.

The isolating and charging device 30 and the isolating device 40 each comprise a contactor 31 or 41, which are provided to disconnect the battery cells 21 from the battery terminals 22, 23 in order to switch the battery terminals 22, 23 to a voltage-free state. On the basis of the high direct voltage of the series-connected battery cells 21, a considerable risk potential is otherwise posed to maintenance personnel or other persons. In addition, a charging contactor 32 with a charging resistor 33 which is connected in series with the charging contactor 32 is provided in the charging and isolating device 30. The charging resistor 33 limits a charging current for the capacitor 60 when the battery 11 is connected to the direct voltage intermediate circuit. For this purpose, the contactor 31 is initially left open and closed only for the charging connector 32. If the voltage appears at the positive battery terminal 22, the voltage of the battery cells 21, the contactor 31 can be closed and, if appropriate, the charging contactor 32 can be opened. The contactors 31, 41 and the charging contactor 32 do not increase the costs for a battery 11 unacceptably since high demands are made of their reliability and of the currents which are to be conducted by them.

If a technical problem occurs in the traction battery of such a traction drive, which problem can lead either directly to the failure of a battery cell or, during further operation of the battery, to a safety-relevant unsafe state of the battery, the battery is changed into a safe state by the battery management system.

This state is brought about according to the prior art in the lithium-ion battery systems by the battery being disconnected from the direct voltage intermediate circuit by opening the contactors of the charging and isolating device.

The guide system of the traction drive has to then cope with the situation that the battery is no longer available as an energy store. Depending on the operating state of the electric motor, the guide system essentially just then ensures in such a situation that the pulse-controlled inverter or inverter is not destroyed. Destruction of the inverter can be brought about, for example, by an unacceptably strong rise in the voltage of the direct voltage intermediate circuit. The guide system can consequently no longer allow for behavior of the traction drive which is appropriate in terms of vehicle movement dynamics, or the guide system can theoretically even no longer set behavior of the traction drive which is appropriate in terms of vehicle movement dynamics owing to the disconnection of the battery.

As a result of this, the traction drive outputs torques which are undesired or even unacceptable in terms of vehicle movement dynamics, in particular suddenly occurring large negative torques. This then has to be dealt with in the overall concept of such a traction drive of a vehicle by additional measures such as, for example, a mechanical freewheel. These additional measures are costly and extremely undesired since they are required only in the case of a technical fault in the battery and therefore are generally never used.

In the earlier patent application by the applicant with the file number DE 10 2010 041 014 A1, a battery system having a battery which has an output voltage which can be adjusted incrementally was described. The block circuit diagram of a drive system (traction drive) 10 with such a battery 110 is illustrated in FIG. 2. The battery 110 is constructed from a plurality of battery modules 130, 140 which are arranged in an individual battery module line 120 and have battery cells which are connected in series and/or in parallel. The battery modules 130, 140 can be connected or bypassed by means of what are referred to as coupling units in the battery module line 120, which are respectively assigned to the battery modules 130, 140. Systems with such batteries 110 are also referred to as battery direct converters (DICO) 110. They can replace the traction battery 10 illustrated in FIG. 1.

The possible profile of the output voltage UB of the battery direct converter 110 (illustrated in FIG. 2) is illustrated in FIG. 3. The output voltage UB is here the voltage generated by the battery module line 120. FIG. 3 shows that the dependence of the output voltage UB on the number k of the battery modules 130, 140 which are connected to the battery module line 120. The battery modules 130, 140 which are connected to each battery module line 120 each have the same module voltage UM. The output voltage UB of the battery module line 120 which is illustrated as a function of the connected number k of battery modules 130, 140 is linear and follows the relation UB=k·UM, where 1<k<n. Here, n is the maximum number of battery modules 130, 140 which can be connected to the battery module line 120. The maximum output voltage UB of the battery module line 120 can then correspondingly assume the value n·UM.

SUMMARY

According to the disclosure, a method for operating an electric traction drive system is made available, in which an electric motor and a battery which is provided to supply the electric motor are arranged. The battery comprises a battery module line which has, for the generation of an adjustable output voltage of the battery, a plurality of battery modules which each comprise at least one battery cell and which can each be connected in series to the battery module line or bypassed in the battery module line. The battery modules are each monitored during operation of the traction drive system for satisfactory functioning. If a technical fault of at least one battery module is detected during the monitoring, the at least one battery module is immediately bypassed. In addition, the traction drive system is changed into a transition state in which the electric motor continues to be supplied and actuated by the connected battery modules of the battery module line in such a way that a currently generated torque can remain unchanged.

According to the disclosure, a device for controlling an electric traction drive system, in which an electric motor and a battery which is provided to supply the electric motor are arranged, is also made available. The battery comprises a battery module line which is provided for the generation of an adjustable output voltage and has a plurality of battery modules which each comprise at least one battery cell and which can each be connected in series to the battery module line or bypassed in the battery module line. The device is designed to monitor each of the battery modules during operation for satisfactory functioning and, if a technical fault of at least one battery module is detected during the monitoring, to actuate the traction drive system in such a way that the at least one battery module is bypassed and the traction drive system is changed into a transition state. In this context, the traction drive system is operated in the transition state such that the electric motor continues to be supplied and actuated by the connected battery modules of the battery module line in such a way that a currently generated torque can remain unchanged.

The disclosure relates, in particular, to batteries which are operated together with a battery direct converter and are connected to a direct voltage circuit of a power inverter.

In traction drives for electric and hybrid vehicles, the traction batteries can therefore preferably be embodied as battery direct converters. The voltage of the direct voltage intermediate circuit can therefore be set incrementally between 0 V and the maximum possible output voltage which is reached when all the battery modules are connected. If a technical fault occurs in one of the battery modules of the battery direct converter, such as for example the sudden failure of at least one of its battery cells or the malfunction of at least one of its battery cells, which during further operation can result in a safety-relevant state of the affected battery module, this battery module is bypassed with the coupling unit which is assigned to it. This battery module is then no longer available to the battery of the battery direct converter for outputting or taking up electrical energy. The battery cells of the affected battery module are not adversely affected during further operation of the remaining, still functionally capable battery modules to the extent that a safety-relevant state of the faulty battery module occurs. As a result, the remaining battery modules can continue to supply the traction drive after the detection of a technical defect in one of the battery modules.

When a technical fault occurs in the battery of the battery direct converter, the traction drive which is operated therewith is defined thanks to the disclosure and reliably changed into a specific transition state until a battery diagnosis and evaluation of the fault have taken place. In the transition state, the drive can continue to be operated with the current torque which the drive has output at the shaft before the technical problem occurred. In the transition state, the torque remains constant and the drive can continue to react to the torque prescriptions which are transmitted by the driver via the accelerator pedal. This is a considerable improvement in terms of vehicle movement dynamics compared to the situation known from the prior art. After the evaluation of the fault, the drive train can then be changed into a type of "fault state" in which the faulty battery module is no longer involved in feeding the drive, wherein the drive can, however, continue to be operated with a reduced performance such as, for example, with a relatively small electrical range.

The additional measures, necessary in the prior art, relating to the drive function such as, for example, the execution of mechanical freewheels which are in any case generally only required and used when a fault occurs in the battery can therefore be eliminated. The method according to the disclosure and the corresponding device do not require additional hardware measures and can therefore be implemented without corresponding additional costs for the manufacture of the drive systems according to the disclosure. The transition operation is therefore maintained until it is possible to decide through a fault diagnosis when and, if appropriate how, the traction battery can be continued to be operated without a safety risk and, in particular, with a relatively low performance.

In one particular embodiment of the disclosure an electric motor which is embodied as a three-phase machine is set by means of a field-oriented closed-loop control system in order to continue to operate the drive system with a constant torque.

In particular, after the drive system has been changed into the transition state, according to the disclosure a battery diagnosis is carried out on the basis of which it is decided whether the drive system will continue to be operated by means of the battery with the failed and bypassed battery module and/or whether further safety-relevant measures are initiated.

According to the disclosure, the drive is advantageously always operated in such a way that the regulation of the drive is ensured even when any desired battery module of the battery direct converter suddenly fails. This measure can have effects on the permissible maximum voltage which the three-phase-drives require at their terminals to maintain their regulation. In addition it is therefore determined at which rotational speeds an asynchronous machine is operated in what is referred to as the field weakening operating mode and no longer outputs its maximum possible torque to the shaft. If a fault occurs in a battery module, the drive can also set the voltage conditions at the terminals of the machine which are necessary for the controlled regulation of the electric motor, even when this faulty battery module is bypassed.

The three-phase machine will then continue to be operated by means of what is referred to as field-oriented regulation or field-oriented closed-loop control which is known to a person skilled in the art, in such a way that the torque request which is predefined by the driver by means of the accelerator pedal is implemented. The driver therefore initially does not notice that one of the battery modules has failed owing to a technical problem and has been bypassed. In the transition phase, it is decided by means of a battery diagnosis and evaluation of the state of the battery whether a technical problem is present which concerns just one battery module or whether a problem is present which relates to the entire battery.

According to the disclosure, when the drive system continues to be operated by means of the battery with the failed and bypassed battery module after the battery diagnosis according to the disclosure has been carried out, the battery can continue to operate the drive system with a correspondingly reduced output voltage. In other words, if it is decided on the basis of the battery diagnosis that the traction drive system can continue to be operated, the traction drive system is then changed into an operating state of a kind in which the electric motor continues to be supplied with an output voltage which is reduced by the value of a battery module voltage corresponding to the bypassed defective battery module.

On the other hand, a sufficiently large number of further battery modules can be connected as a replacement for the at least one bypassed defective battery module. With such a procedure, the electric motor can continue to be supplied with an unchanged or only slightly reduced output voltage.

This means also that depending on the result of the battery diagnosis which is carried out it is possible to decide whether the traction drive continues to be operated with the exclusion of just the one, faulty battery module or whether further measures to ensure safety, such as, for example, switching off further battery modules, warning the driver or reducing the performance of the drive, have to be initiated.

On the basis of the current state of the battery it is furthermore also possible for the sudden failure of two or more battery modules to be safely dealt with. This merely requires here that a correspondingly high voltage margin is to be maintained during the operation of the drive compared to the maximum available voltage.

In one particular advantageous embodiment of the disclosure, if the drive system continues to be fed by means of the battery with the failed and bypassed battery module and subsequently a further battery module fails, the drive system continues to be operated by means of a correspondingly repeated method. This means that the method according to the disclosure described above can continue to be used even if the battery already has a faulty module, but the rest of the battery continues to be operated. For this purpose, the battery management system or the regulation system of the drive merely has to take into account that the available maximum voltage, the storage capacity and the performance of the battery are adapted to the conditions which arise as a result of the failure of a battery module.

By means of the method according to the disclosure and the device it is possible for a situation in which at least one battery fails to be reliably dealt with in that the drive is reliably changed into a transition state in which it is possible to continue to react to current torque prescriptions by the driver.

According to a further aspect of the disclosure, an electric battery system is provided which comprises a battery module line with a plurality of battery modules which each comprise at least one battery cell. The battery modules can each be connected in series to the battery module line or bypassed in the battery module line, with the result that a variable output voltage for the battery can be set.

According to the disclosure, the battery can be, in particular, a lithium-ion battery.

In addition, according to the disclosure, a vehicle is made available which has an electric traction drive system, in which an electric motor and a battery which is provided to supply the electric motor are arranged. The battery comprises here, for the generation of an adjustable output voltage, a battery module line with a plurality of battery modules which each comprise at least one battery cell. The battery modules are embodied in such a way that they can each be connected in series to the battery module line or bypassed in the battery module line. Furthermore, the traction drive system in the vehicle has the control device according to the disclosure.

Advantageous developments of the disclosure are specified in the dependent claims and described in the description.

BRIEF DESCRIPTION OF THE DRAWINGS

Exemplary embodiments of the disclosure are explained in more detail with reference to the drawings and the following description. In the drawings.

DETAILED DESCRIPTION

Figure 4:
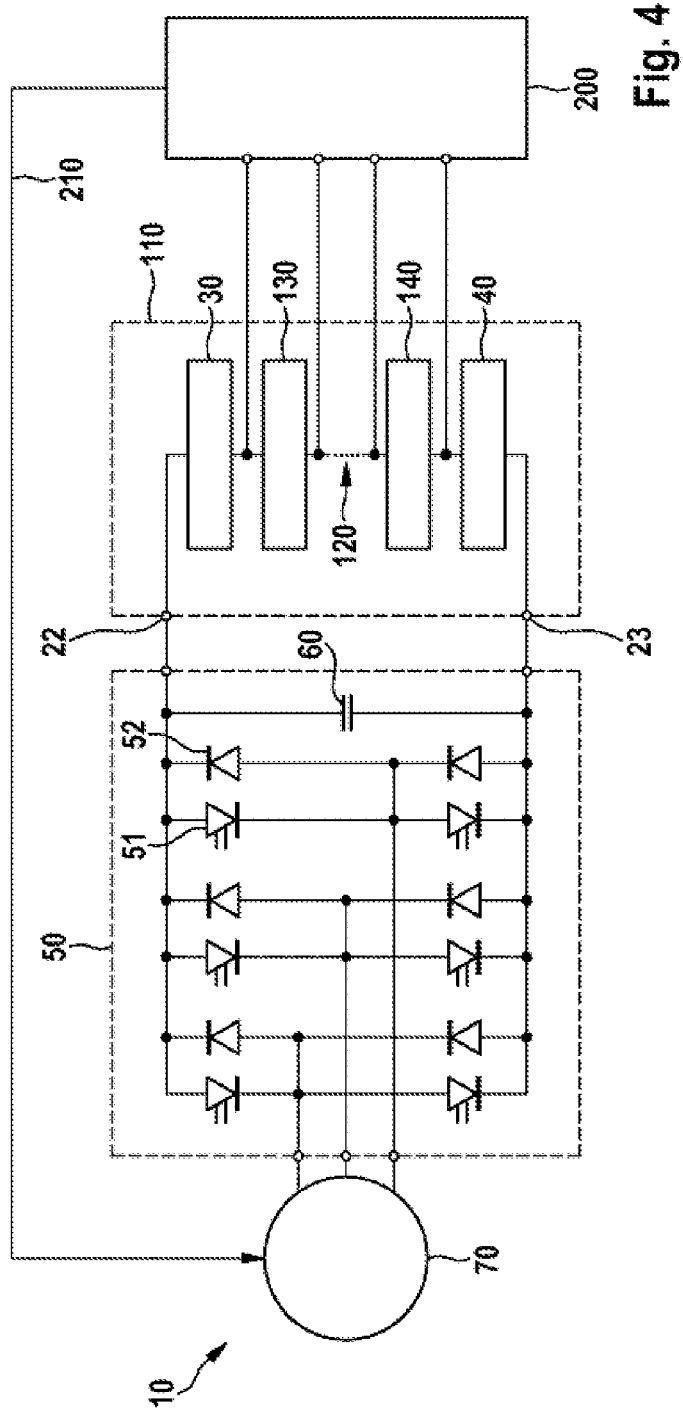
FIG. 4 shows a basic circuit diagram of a traction drive according to a first embodiment of the disclosure with an electric motor which is connected to a battery with a battery module line which is constructed from a plurality of battery modules with at least one battery cell each, wherein the battery modules are embodied, for the generation of an adjustable output voltage of the battery, in such a way that they can be connected in series to the battery module line or can be bypassed.

FIG. 4 illustrates the basic circuit diagram of a traction drive 10 according to a first embodiment of the disclosure.

The traction drive comprises a battery (traction battery) 110 which is connected to a direct voltage intermediate circuit which is buffered by a capacitor 60. In addition, a pulse-controlled inverter 50 is connected to the direct voltage intermediate circuit, said pulse-controlled inverter 50 making available sinusoidal voltages with phases which are offset with respect to one another via, in each case, two switchable semiconductor valves 51 and two diodes 50 at three outputs, for operating the electric motor 70. According to this embodiment, the electric motor 70 is embodied as a three-phase motor.

Figure 1:
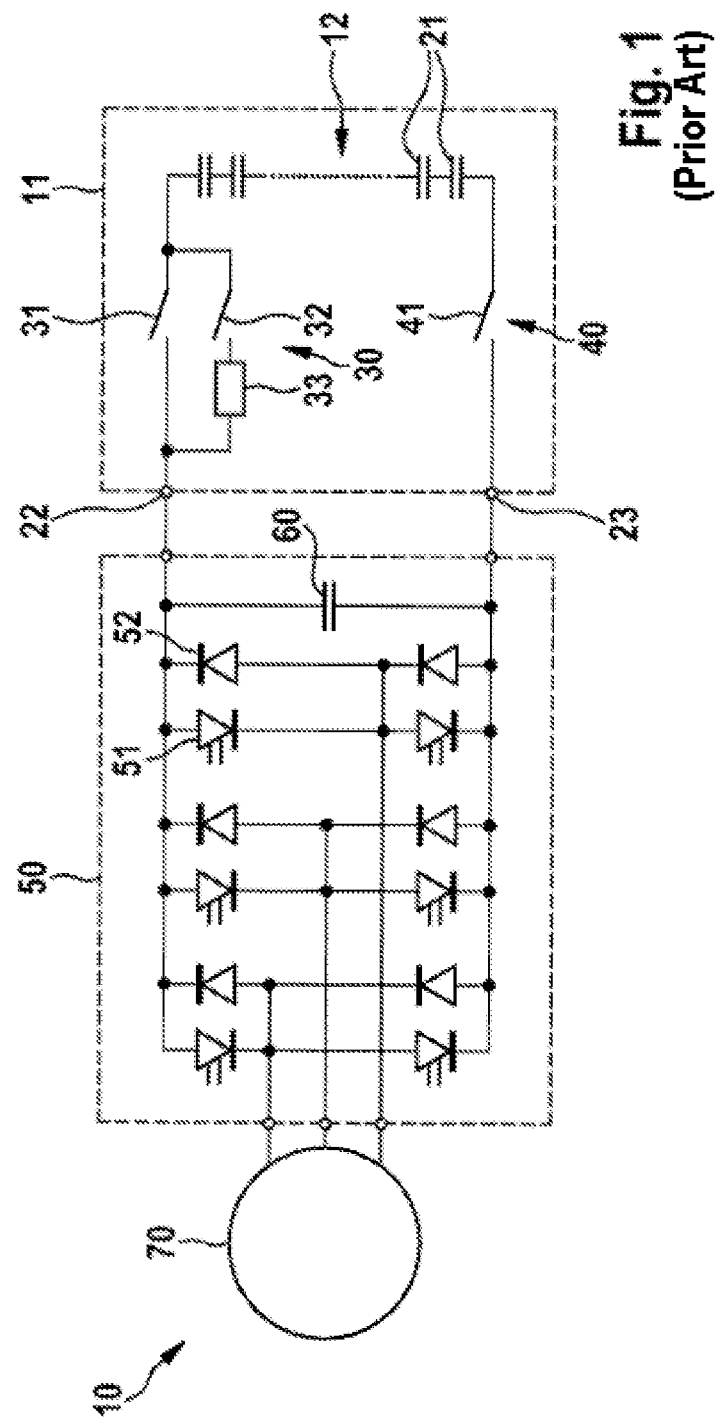
FIG. 1 shows the basic circuit diagram of a traction drive, known from the prior art, with an electric motor which is connected to a battery with a battery module line which is constructed from a plurality of battery cells.
Figure 2:
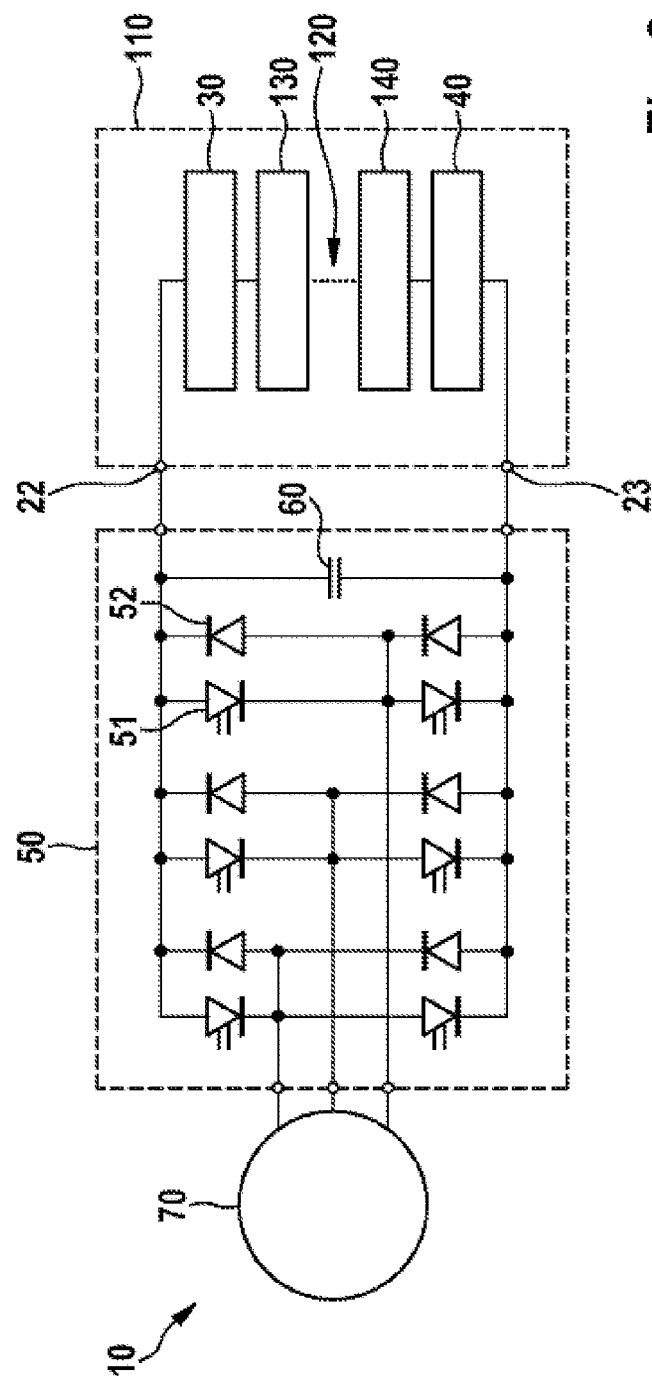
FIG. 2 shows the basic circuit diagram of a traction drive, known from the prior art, with an electric motor which is connected to a battery with a battery module line which is constructed from a plurality of battery modules with at least one battery cell each, wherein for the purpose of generating an adjustable output voltage the battery modules of the battery are embodied in such a way that they can be connected in series to the battery module line or can be bypassed.
Figure 3:
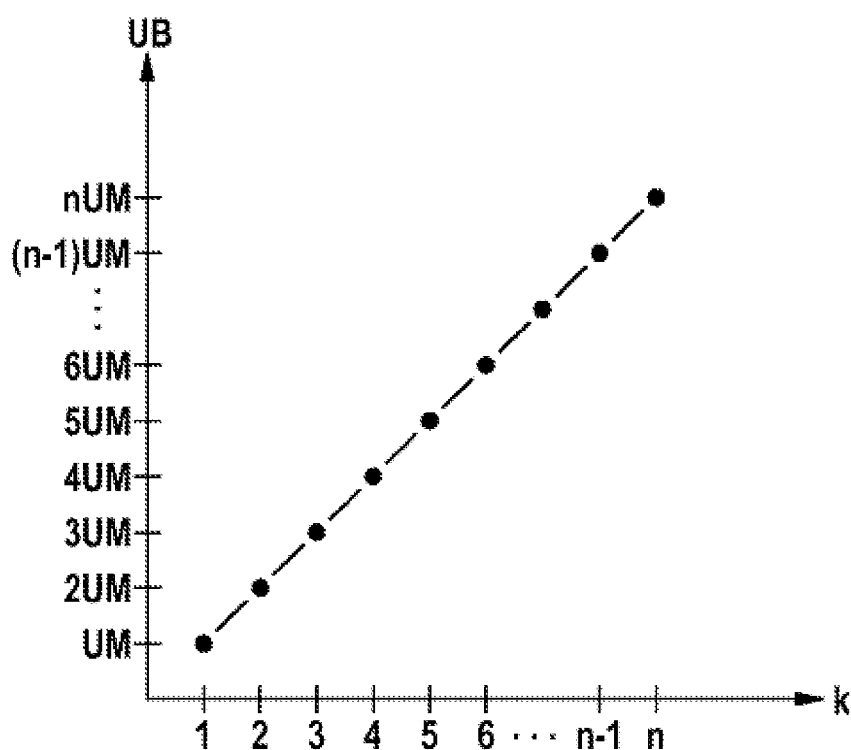
FIG. 3 shows a possible profile of the output voltage of the battery illustrated in FIG. 2, as a function of the number of battery modules which are connected to form the battery module line.

The battery 110 comprises a battery module line 120 with a plurality of battery modules 130, 140 which are arranged in the battery module line and which are constructed from battery cells which are connected in series and/or in parallel. In order to simplify the illustration, only two battery modules 130, 140 are shown in FIG. 4. The battery modules 130, 140 can be connected or bypassed by means of what are referred to as coupling units (not illustrated separately), respectively assigned to them, in the battery module line 120. A charging and isolating device 30, which is embodied like the charging and isolating device from FIG. 1, is connected between the positive pole of the topmost battery module 130 and a positive battery terminal 22. Optionally, an isolating device 40, which is embodied, for example, like the isolating device from FIG. 1, can be additionally connected between the negative pole of a bottommost battery module 140 and a negative battery terminal 23. Systems with such batteries 110 are, as already mentioned, referred to as battery direct converters (DICO) 110.

The traction drive system 10 according to the disclosure also comprises a control device 200 which is electrically connected to the respective connections of the battery modules 130, 140. The control device 200 is also designed to measure the voltages of the individual battery modules 130, 140. In addition, the control device 200 is designed in such a way that if a battery module 130, 140 which is connected to the battery module line 120 fails while the traction drive system 10 is operating or if a defect of the battery module is detected, they continue to supply the electric motor 70 by means of the battery 110, but without the failed and bypassed battery modules 130, 140 and to set the electric motor 70 here via the control line 210 in such a way that the drive system 10 is changed into a transition state in which the drive system 10 supplies an initially unchanged torque as before the failure of the at least one battery module 130, 140.

According to the embodiment shown in FIG. 4, this is achieved, in particular, in that the electric motor 70, which is embodied as a three-phase machine, here an asynchronous machine, is set or actuated by means of a field-oriented closed-loop control system.

In addition, the control device 200 according to the particular embodiment shown here is designed to carry out a battery diagnosis during the time period in which the drive system 10 is in the transition state, and to decide in response thereto whether the traction drive 10 will continue to be operated with at least one failed and bypassed battery module 130, 140 and/or whether other safety-relevant measures are initiated. The control device 200 preferably has a battery diagnosis unit for this purpose.

According to the disclosure, a method and a control device are therefore provided with which an electric drive system which has a battery direct converter can advantageously be changed into a transition state in which the current torque is not reduced.

The invention claimed is:

1. A method for operating an electric traction drive system, comprising:
monitoring each of a plurality of battery modules of a battery during operation of the traction drive system to detect a technical fault in one of the plurality of battery modules of the battery, the battery having a battery module line that provides a battery output voltage that supplies an electric motor and, each of the plurality of battery modules having at least one battery cell, each of the plurality of battery modules being configured to be connected in series with the battery module line or bypassed in the battery module line;
bypassing at least one battery module of the plurality of battery modules if a technical fault of the at least one battery module is detected during the monitoring;
operating the traction drive system in a transition state, wherein the electric motor is supplied and actuated by first battery modules of the plurality of battery modules in the transition state to enable a currently generated torque to remain unchanged, the first battery modules being connected in the battery module line; and
carrying out a battery diagnosis while the traction drive system is operated in the transition state to determine at least one of whether to continue operating the traction drive system with the at least one bypassed battery module and whether to initiate safety-relevant measures.

2. The method as claimed in claim 1, wherein the electric motor is embodied as a three-phase machine and the electric motor is operated with a field-oriented closed-loop control system in the transition state.

3. The method as claimed in claim 1, further comprising:
operating the traction drive system into an operating state if the determination of the battery diagnosis is to continue to operate the traction drive system, wherein the electric motor continues to be supplied with the battery output voltage and the battery output voltage is reduced by a voltage value of a battery module voltage corresponding to the at least one bypassed battery module in the operating state.

4. The method as claimed in claim 1, further comprising:
connecting a sufficiently large number of second battery modules from the plurality of battery modules as a replacement to the at least one bypassed battery module to continue to supply the electric motor with an unchanged amount of the battery output voltage or a reduced amount of the battery output voltage if the determination of the battery diagnosis is to continue to operate the traction drive system.

5. The method as claimed in claim 4, further comprising:
monitoring each of the plurality of battery modules if a third battery module from the second battery modules fails; and
determining whether to bypass the third battery module based on a further battery diagnosis.

6. A device for controlling an electric traction drive system, wherein the device is configured to:

monitor each of a plurality of battery modules of a battery during operation of the traction drive system to detect a technical fault in one of the plurality of battery modules of the battery, the battery having a battery module line that provides a battery output voltage that supplies an electric motor, each of the plurality of battery modules having at least one battery cell, each of the plurality of battery modules being configured to be connected in series with the battery module line or bypassed in the battery module line; and actuate the traction drive system to bypass at least one battery module of the plurality of battery modules if a technical fault of the at least one battery module is detected during the monitoring;

operate the traction drive system in a transition state, wherein the electric motor is supplied and actuated by first battery modules of the battery modules in the transition state to enable a currently generated torque of the electric motor to remain unchanged, the first battery modules being connected in the battery module line; and carry out a battery diagnosis while the traction drive system is operated in the transition state to determine at least one of whether to continue operating the traction drive system with the at least one bypassed battery module and whether to initiate safety-relevant measures.

7. The device as claimed in claim 6, wherein the device is further configured to:
at least one of:
(i) operate the electric motor according to a field-oriented closed-loop control system and
(ii) carry out a battery diagnosis, using a battery diagnosis unit, while the traction drive system is operated in the transition state to determine at least one of whether to continue operating the traction drive system with the at least one bypassed battery module and whether to initiate safety-relevant measures, wherein the device comprises the battery diagnosis unit.

8. A battery system comprising:
a battery including a battery module line and a plurality of battery modules, each of the battery modules having at least one battery cell, each of the plurality of battery modules being configured to be connected in series with the battery module line to generate an adjustable output voltage of the battery or bypassed in the battery module line, an electric motor being supplied by the adjustable output voltage of the battery; and a device configured to:
monitor each of the plurality of battery modules during operation of an electric traction drive system to detect a technical fault in one of the plurality of battery modules of the battery;

actuate the traction drive system to bypass at least one battery module of the battery modules if a technical fault of the at least one battery module is detected during the monitoring;

operate the traction drive system in a transition state, wherein the electric motor is supplied and actuated by first battery modules of the battery modules in the transition state to enable a currently generated torque of the electric motor to remain unchanged, the first battery modules being connected to the battery module line; and carry out a battery diagnosis while the traction drive system is operated in the transition state to determine at least one of whether to continue operating the traction drive system with the at least one bypassed battery module and whether to initiate safety-relevant measures.

9. The battery system of claim 8, wherein the battery system is comprised by the traction drive system and a vehicle includes the traction drive system.

* * * * *